Dec. 24, 1968  N. SCHOTT  3,418,450
COMBINATION CAR HEATER AND BATTERY CHARGER
Filed June 20, 1966
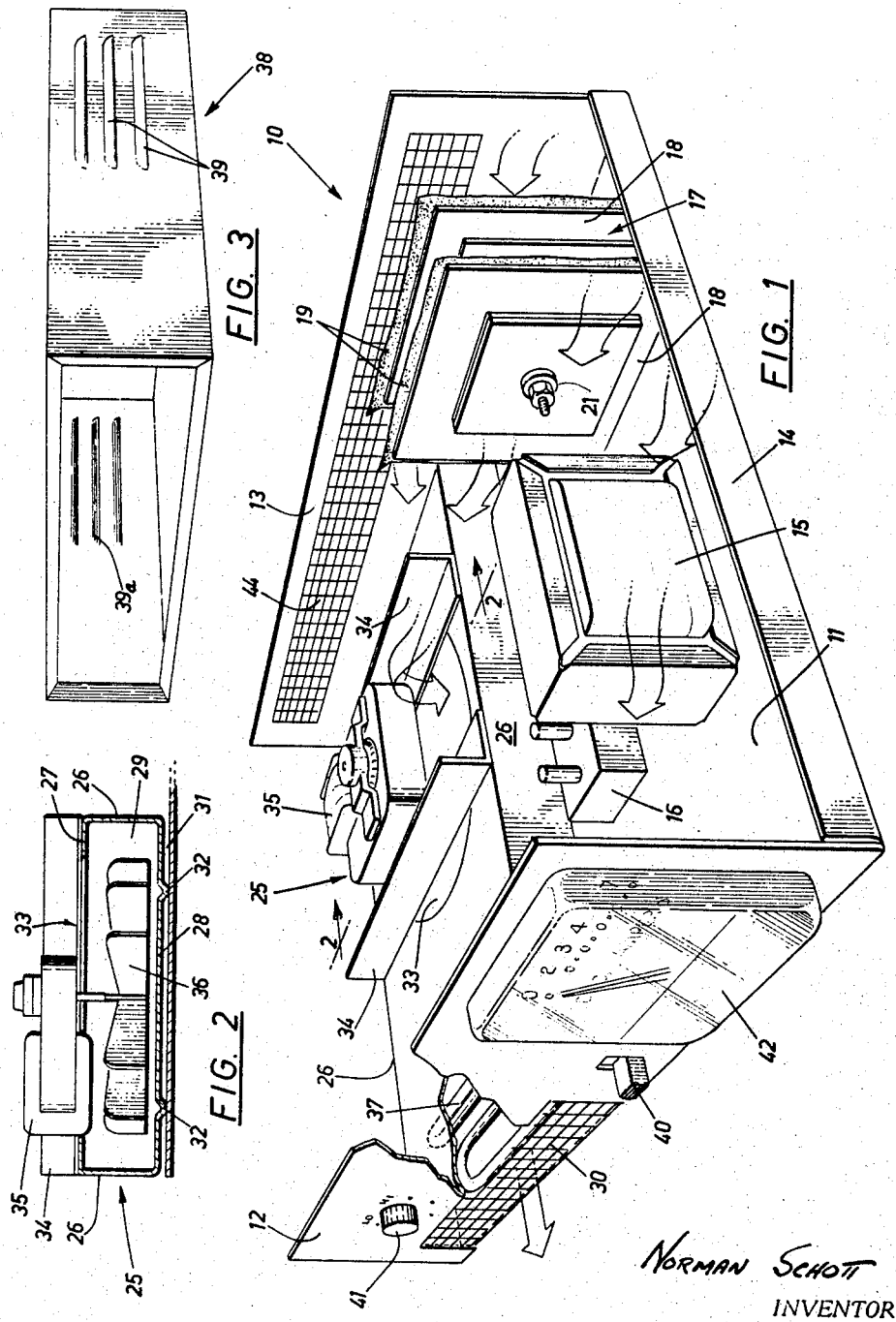
Norman Schott
INVENTOR.
BY
Patent Agent

United States Patent Office 3,418,450
Patented Dec. 24, 1968

---

3,418,450
COMBINATION CAR HEATER AND BATTERY CHARGER
Norman Schott, Malton, Ontario, Canada, assignor to Rotor Electric Co. Ltd., Rexdale, Ontario, Canada
Filed June 20, 1966, Ser. No. 558,995
Claims priority, application Canada, Mar. 23, 1966, 955,645
7 Claims. (Cl. 219—279)

This invention relates to an automobile accessory adapted both to warm the interior of an automobile and to re-charge the storage battery of the automobile.

One object of this invention is to provide a combination car-heater and battery-charger in which the different components are so arranged and interconnected that it is possible simultaneously to charge the storage battery, warm the interior of the automobile, and cool the battery-charging apparatus.

Another object of this invention is to provide a combination car heater and battery charger in which the components are compactly arranged.

According to this invention, these and other objects are achieved through the provision, for use with a vehicle which utilizes a storage battery, of an accessory comprising: an enclosure, an open-ended conduit within said enclosure having one end communicating with the interior of said enclosure and the other end opening out through a wall of the enclosure, fan means within the enclosure for promoting flow of air from the interior of said enclosure into the conduit at said one end to emerge at said other end, a heating element located within said conduit for heating air passing therealong, battery-charging apparatus mounted in said enclosure and including a rectifier which generates heat during rectification, at least one air-intake opening through at least one wall of the enclosure, the opening being so located that air passing through the interior of the enclosure from said opening to said one end of the conduit under the urging of the fan means flows past said rectifier and exerts a cooling effect thereon.

One embodiment of this invention is shown in the accompanying drawings, in which:

FIG. 1 is a perspective view of a chassis upon which are arranged the several components of the automobile accessory to which this invention is directed;

FIG. 2 is a cross-sectional view taken at the line 2—2 in FIG. 1; and

FIG. 3 is a perspective view, to a smaller scale than FIG. 1, of a housing into which the chassis of FIG. 1 fits.

Referring first to FIG. 1, a chassis 10 of generally rectangular shape includes a plate 11 having an upstanding forward wall 12 along one edge and an upstanding rearward wall 13 along the opposite edge. The plate 11 also has a low, upstanding side wall 14. The area of the chassis 10 can be considered to be in two sections, one section housing the battery-charging components, and the other section housing the car-heating components. The section housing the battery-charging components is the nearer section in FIG. 1, and can be seen generally to include a transformer 15, a current limiting protector 16 and a selenium oxide rectifier 17. Although these last-named components are the usual ones employed in a vehicle battery charger, it will be clear that this invention is applicable to any battery-charging components which generate heat during rectification. The selenium oxide rectifier 17 generally comprises two rectifying plates 18, and has two sheets of insulation material 19 arranged to shield the plates from each other and from the upstanding rearward wall 13. A vertical bracket (not visible in the figures) rises from the plate 11 rearwardly of the rectifier 17, and serves to support the rectifier 17 by well-known support and spacer means of which a part is visible at 21 in FIGURE 1.

Mounted on the remoter section of the chassis 10 is a shallow, box-like structure 25 which contains and supports the car-heating components of the invention. Preferably, the structure 25 is constructed as a separate unit, with two solid, vertical side walls 26 (see FIG. 2), a top wall 27, a bottom wall 28 adjacent the plate 11 and a rearend wall 29 adjacent the rearward wall 13 of the chassis 10. The structure 25 opens out through the upstanding forward wall 12 of the chassis 10, as shown at 30. In order to provide a heat insulating space 31 between the plate 11 and the structure 25, the bottom wall of the structure 25 can be provided with downward protuberances 32 which space the structure 25 from the plate 11. Upward protuberances could be provided on the plate 11 in addition to or in place of the downward protuberances 32.

The top wall 27 of the structure 25 has a circular opening 33 therethrough, located towards the rear wall 13. Two anglebars 34 bridge across the opening 33 in parallel spaced-apart relationship and support between them an electric motor 35 of standard construction having its shaft extending vertically and concentrically downward through the circular opening 33 into the interior of the structure 25. A centrifugal impeller 36 is supported from and mounted on the lower end of the vertical shaft of the motor 35, as shown in FIG. 2. Naturally, the centrifugal impeller 36 is mounted such that, during rotation, it does not touch any part of the structure 25.

Located within the structure 25 is an electrical heating element 37 familiar in the prior art (FIG. 1).

The chassis 10 with all of the mounted components as described above is adapted to be slid into the housing 38 (FIG. 3) from the rear end thereof. It will be appreciated that when the chassis 10 and the housing 38 are assembled together, they define an enclosure containing the components described above.

The construction of the structure 25 is such that it constitutes within the enclosure an open-ended conduit having one end, i.e., the circular opening 33, communicating with the interior of the enclosure, and the other end, i.e., the open end at 30, opening out through the wall 12, the latter constituting a wall of the enclosure. When the fan 35 is operated, it will promote flow of air from the interior of the enclosure into the conduit as defined by the structure 25 at the "one end" thereof constituted by the circular opening 33, to emerge at the other end 30. The heating element 37 is adapted in the normal way to heat air passing along the conduit defined by the structure 25.

The particular problem which this invention aims at overcoming is related to the fact that both the transformer 15 and the selenium oxide rectifier 17, particularly the latter, tend to heat up considerably when in operation. Without the provision of some means for cooling these components, there is a danger that one or both of them would break down and cease to function. The remedy provided by this invention is to combine the fan of a car heater with the components of the battery charging apparatus within a single enclosure having at least one air-intake opening, the battery-charging components and the fan being so arranged with respect to each other and to the air-intake opening that air passing through the interior of the enclosure from the air-intake opening under the urging of the fan flows past the components and exerts a cooling effect thereon. As shown in FIG. 3, air-intake louvers 39 are located in the housing 38 such that air entering the louvers 39 flows past and between the selenium oxide plates 18, thence toward the circular opening 33 and the fan 35. Because of the proximity of the selenium oxide plates 18 to the transformer 15, some of the air flow will envelop the transformer 15 and cool it.

It is contemplated to supply A.C. power directly to the fan 33 and to the heating element 37, and to provide an on-off switch 40 between the A.C. power source and the primary winding of transformer 15. It is preferable that there be no switch between the A.C. power source and the fan motor so as to ensure operation of the fan whenever the unit is plugged in. This will ensure a supply of cooling air for the rectifier 17 even if the heating element 37 is not energized. The heating element 37 is controlled by a thermostat 41.

It would also be possible to control both the fan 33 and the heating element 37 by the thermostat 41, although in this case there would have to be an additional wiring arrangement whereby the fan 33 would be switched on whenever the battery-charging apparatus was energized, regardless of whether the thermostat 41 were open or closed.

The combination battery-charger and car-heater of this invention is adapted to deliver charging current to the storage battery of the car by means of a plug (not shown) insertable in the automatic cigarette lighter of the car. This expedient is well known in the prior art, and need not be shown or described in detail.

The thermostat 41 is mounted on the forward wall 12 to regulate the heating element 37 in the usual way, and an ammeter 42 is provided to register the battery-charging current.

If desired, further air-intake openings may be provided for the enclosure. For example, another set of louvers 39a can be provided in the housing 38 on the wall opposite to louvers 39, and an elongated opening 44 can be provided in the upstanding rearward wall 13.

What I claim as my invention is:

1. For use with a vehicle which utilizes a storage battery, an accessory comprising: an enclosure, an open-ended conduit within said enclosure having one end communicating with the interior of said enclosure and the other end opening out through a wall of the enclosure, fan means for promoting flow of air from the interior of said enclosure into the conduit at said one end to emerge at said other end, a heating element located within said conduit for heating air passing therealong, battery-charging apparatus mounted in said enclosure and including a rectifier which generates heat during rectification, at least one air-intake opening through at least one wall of the enclosure, the opening being so located that air passing through the interior of the enclosure from said opening to said one end of the conduit under the urging of the fan means flows past said rectifier and exerts a cooling effect thereon.

2. An accessory as claimed in claim 1, in which the fan means comprises a centrifugal impeller and an electric motor for driving said impeller.

3. An accessory as claimed in claim 1 in which the battery-charging apparatus further includes a transformer which generates heat when in operation, the transformer being so located within the enclosure that air passing through the interior of the enclosure from said air-intake opening to said one end of the conduit under the urging of the fan means flows past the transformer and exerts a cooling effect thereon.

4. An accessory as claimed in claim 1, in which the rectifier is a selenium oxide rectifier in the general form of a plurality of parallel plates, the plates being oriented substantially parallel to the inflow direction of air through said intake opening.

5. An accessory as claimed in claim 1, in which said conduit has substantially the shape of a rectangular parallelepiped of which a first face is open and constitutes said other end, a second face adjacent said first face having therethrough a circular opening remote from said first face, the circular opening constituting said one end, a third face of the rectangular parallelepiped opposite said second face lying adjacent a wall defining the enclosure and having protuberances adapted to space said third face from said last-mentioned wall, thereby to provide a heat insulating air-space between said last-mentioned wall and the conduit.

6. An accessory as claimed in claim 5 in which the fan means comprises a centrifugal impeller within the conduit coaxial with said circular opening and an electric motor mounted on said second face for driving said impeller.

7. An accessory as claimed in claim 6 in which the rectifier is a selenium oxide rectifier in the general form of a plurality of parallel plates, the plates being oriented substantially parallel to the inflow direction of air through said air-intake opening, and in which the battery-charging apparatus further includes a transformer which generates heat when in operation, the transformer being so located within the enclosure that air passing through the interior of the enclosure from said air-intake opening to said one end of the conduit under the urging of the fan means flows past the transformer and exerts a cooling effect thereon.

References Cited

UNITED STATES PATENTS

| 1,787,850 | 1/1931 | Wolf | 320—59 |
| 1,954,931 | 4/1934 | Hambuechen | 320—59 |
| 2,101,571 | 12/1937 | Breisch. | |
| 2,427,713 | 9/1947 | Caldwell | 219—209 X |
| 2,565,273 | 8/1951 | Shuler et al. | 320—57 |
| 3,264,450 | 8/1966 | Wallace | 219—202 X |

FOREIGN PATENTS

| 478,531 | 11/1951 | Canada. |
| 610,882 | 10/1948 | Great Britain. |

ANTHONY BARTIS, *Primary Examiner.*

U.S. Cl. X.R.

219—202, 370, 366; 320—2